(12) United States Patent
Igarashi

(10) Patent No.: US 8,003,950 B2
(45) Date of Patent: Aug. 23, 2011

(54) RADIATION DETECTOR, X-RAY CT APPARATUS, AND METHOD FOR MANUFACTURING RADIATION DETECTOR

(75) Inventor: Kenji Igarashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 12/355,330

(22) Filed: Jan. 16, 2009

(65) Prior Publication Data

US 2009/0184250 A1 Jul. 23, 2009

(30) Foreign Application Priority Data

Jan. 18, 2008 (JP) .................... 2008-009762
Jan. 13, 2009 (JP) .................... 2009-004324

(51) Int. Cl.
*G01T 1/24* (2006.01)
(52) U.S. Cl. .................... 250/370.01
(58) Field of Classification Search ........... 250/370.01, 250/370.09, 370.11, 484.4
See application file for complete search history.

(56) References Cited

U.S. PATENT DOCUMENTS

| | | | | |
|---|---|---|---|---|
| 6,025,598 A * | 2/2000 | Tago | | 250/370.01 |
| 7,402,814 B2 * | 7/2008 | Vieux et al. | | 250/370.11 |
| 7,495,227 B2 * | 2/2009 | Hennessy et al. | | 250/370.09 |
| 2004/0245474 A1 * | 12/2004 | Vieux et al. | | 250/370.11 |
| 2006/0261287 A1 * | 11/2006 | Andou et al. | | 250/484.4 |
| 2007/0138400 A1 * | 6/2007 | Ertel et al. | | 250/370.11 |
| 2008/0078939 A1 * | 4/2008 | Hennessy et al. | | 250/370.09 |
| 2008/0078940 A1 * | 4/2008 | Castleberry et al. | | 250/370.09 |
| 2009/0014659 A1 * | 1/2009 | Hennessy et al. | | 250/370.09 |

FOREIGN PATENT DOCUMENTS

| | | |
|---|---|---|
| JP | 2001-120539 | 5/2001 |
| JP | 2001-242253 A | 9/2001 |
| JP | 2006-314779 A | 11/2006 |

* cited by examiner

*Primary Examiner* — David P Porta
*Assistant Examiner* — Mark R Gaworecki
(74) *Attorney, Agent, or Firm* — Finnegan, Henderson, Farabow, Garrett & Dunner, L.L.P.

(57) ABSTRACT

A radiation detector includes: a base plate; and a radiation detection unit provided on one major surface side of the base plate and configured to output an electrical signal proportional to intensity of radiation. The base plate includes a buffer section at a junction with the radiation detection unit, the buffer section being configured to absorb stress generated at the junction due to temperature variation.

22 Claims, 8 Drawing Sheets

RADIATION DETECTOR, X-RAY CT APPARATUS, AND METHOD FOR MANUFACTURING RADIATION DETECTOR

CROSS-REFERENCE TO RELATED APPLICATIONS

This application is based upon and claims the benefit of priority from the prior Japanese Patent Application No. 2008-009762, filed on Jan. 18, 2008; and the prior Japanese Patent Application No. 2009-004324, filed on Jan. 13, 2009; the entire contents of which are incorporated herein by reference.

BACKGROUND OF THE INVENTION

1. Field of the Invention

This invention relates to a radiation detector, an X-ray CT apparatus, and a method for manufacturing a radiation detector.

2. Background Art

In an X-ray CT (computer tomography) apparatus, a solid-state detector (hereinafter referred to as a radiation detector) based on a scintillator is used to increase the number of detection points to improve spatial resolution.

The radiation detection unit provided in this radiation detector includes numerous photoelectric conversion elements partitioned on a substrate and scintillators laminated thereon. The scintillators, which correspond to respective detection compartments of the photoelectric conversion elements, are separated and partitioned by grooves. Furthermore, the radiation detection unit includes collimator plates, which control X-ray radiation incident on the individual scintillators and absorb scattered radiation to reduce crosstalk due to the scattered radiation.

To meet the demand for rapid and high-definition photographing in a wide area, JP-A-2001-120539 (Kokai), for example, proposes a technique of using a multi-slice detector including a plurality of radiation detection units in the slice direction to also make efficient use of cone beams, that is, the spread angle (cone angle) of X-ray radiation in the slice direction.

However, the technique disclosed in JP-A-2001-120539 (Kokai) does not take into consideration the effect of temperature variation. Hence, for example, the linear expansion coefficient is different between the substrate with the photoelectric conversion elements provided thereon and the base plate to which the substrate is attached. Thus, a difference occurs in the amount of thermal expansion or shrinkage, which may cause a gap between the radiation detection units and/or destroy the substrate with the photoelectric conversion elements provided thereon, for example. As the number of radiation detection units disposed in the slice direction increases, the effect of temperature variation may increase.

SUMMARY OF THE INVENTION

According to an aspect of the invention, there is provided a radiation detector including: a base plate; and a radiation detection unit provided on one major surface side of the base plate and configured to output an electrical signal proportional to intensity of radiation, the base plate including a buffer section at a junction with the radiation detection unit, the buffer section being configured to absorb stress generated at the junction due to temperature variation.

According to another aspect of the invention, there is provided an X-ray CT apparatus including: an X-ray source; a radiation detector configured to output an electrical signal corresponding to intensity of X-ray radiation which is applied from the X-ray source and transmitted through a subject; a rotation ring configured to allow the X-ray source and the radiation detector to rotate around the subject; and a reconstructing device configured to reconstruct a tomographic image of the subject on basis of the electrical signal outputted from the radiation detector, the radiation detector including: a base plate; and a radiation detection unit provided on one major surface side of the base plate and configured to output an electrical signal proportional to intensity of radiation, the base plate including a buffer section at a junction with the radiation detection unit, the buffer section being configured to absorb stress generated at the junction due to temperature variation.

According to another aspect of the invention, there is provided a method for manufacturing a radiation detector, including: forming a radiation detection unit by fixing a photoelectric conversion device on a surface of a scintillator opposite to a surface thereof on which radiation is incident; processing a base plate to form a junction with the radiation detection unit and a buffer section configured to absorb stress generated at the junction due to temperature variation; and attaching the radiation detection unit to the base plate, at least one or more of the junctions being formed in the buffer section.

DETAILED DESCRIPTION OF THE INVENTION

Embodiments of the invention will now be described with reference to the drawings. In the drawings, like components are labeled with like reference numerals, and the detailed description thereof is omitted as appropriate.

The radiation detector according to the embodiments of the invention is also applicable to various other radiations, such as y-ray radiation, besides X-ray radiation. However, for convenience of description, X-ray radiation is taken as a typical example of radiations in the following description. Hence, the following embodiments are also applicable to other radiations by replacing the "X-ray radiation" therein by "radiation".

Figure 1A:
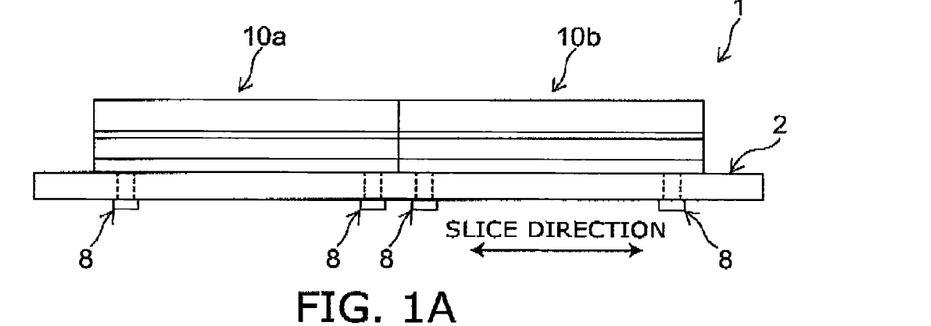
FIGS. 1A and 1B are schematic views for illustrating a radiation detector according to an embodiment of the invention.
Figure 1B:
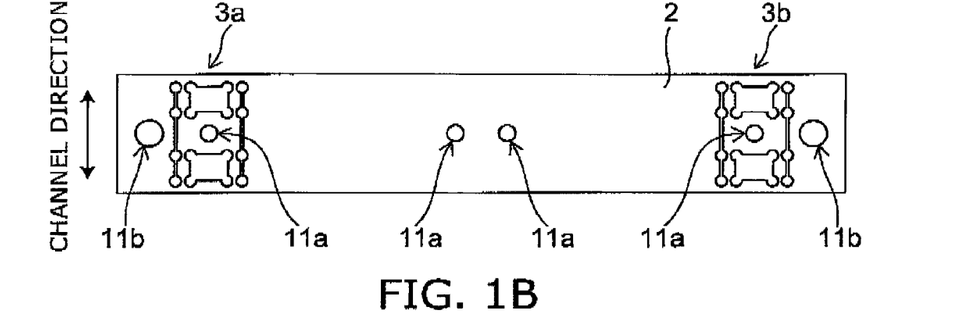

FIG. 1 is a schematic view for illustrating a radiation detector according to an embodiment of the invention. More specifically, FIG. 1A is a schematic front view of the radiation detector 1, and FIG. 1B is a schematic plan view of a base plate 2.

Figure 2A:
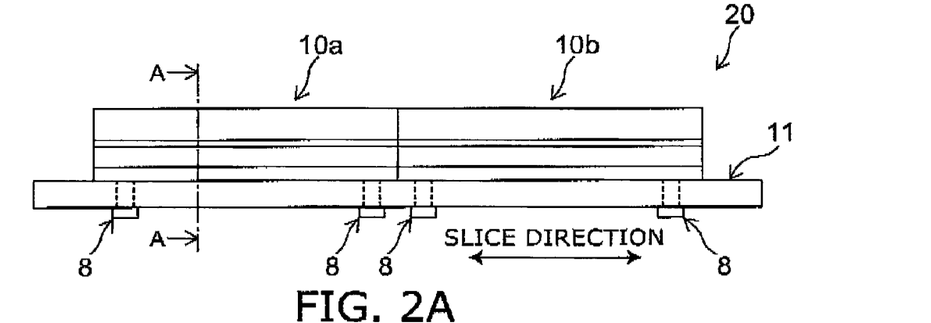
FIGS. 2A and 2B are schematic view for illustrating a comparative example investigated by the inventor.
Figure 2B:
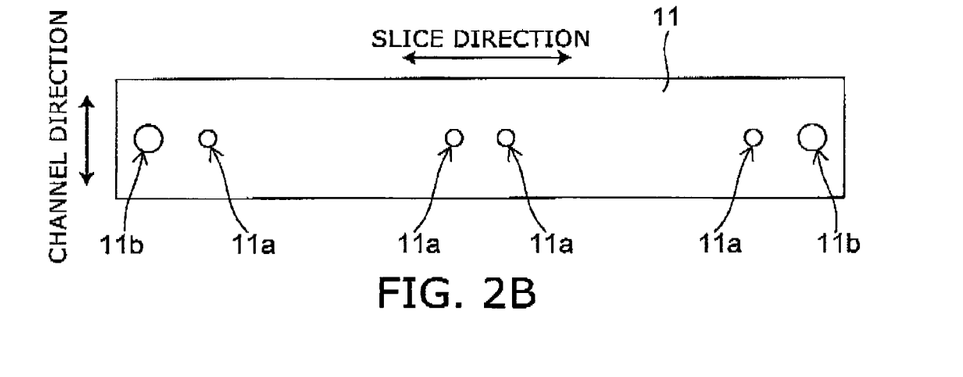

FIG. 2 is a schematic view for illustrating a comparative example investigated by the inventor. More specifically, FIG. 2A is a schematic front view of a radiation detector 20, and FIG. 2B is a schematic plan view of a base plate 11. First, the comparative example of FIG. 2 is illustrated.

As shown in FIG. 2A, the radiation detector 20 includes a base plate 11 and radiation detection units 10a, 10b provided on one major surface of the base plate 11. Furthermore, as shown in FIG. 2B, the base plate 11 includes attachment holes 11a for attaching the radiation detection units 10a, 10b. The attachment holes 11a are provided on a line passing through generally the center of the width (channel direction) of the base plate 11. Attachment screws 8 inserted in the attachment holes 11a are screwed into the attachment sections, not shown, of the radiation detection units 10a, 10b so that the radiation detection units 10a, 10b are attached to the base plate 11. Furthermore, the radiation detection units 10a, 10b are attached so that the end surfaces of the radiation detection units 10a, 10b adjoining in the slice direction are in close contact with each other.

The base plate 11 further includes attachment holes 11b for attaching the radiation detector 20 illustratively to a two-dimensional detector system 103 (see FIG. 13) described later.

Next, the radiation detection unit 10a, 10b is illustrated.

Figure 3:
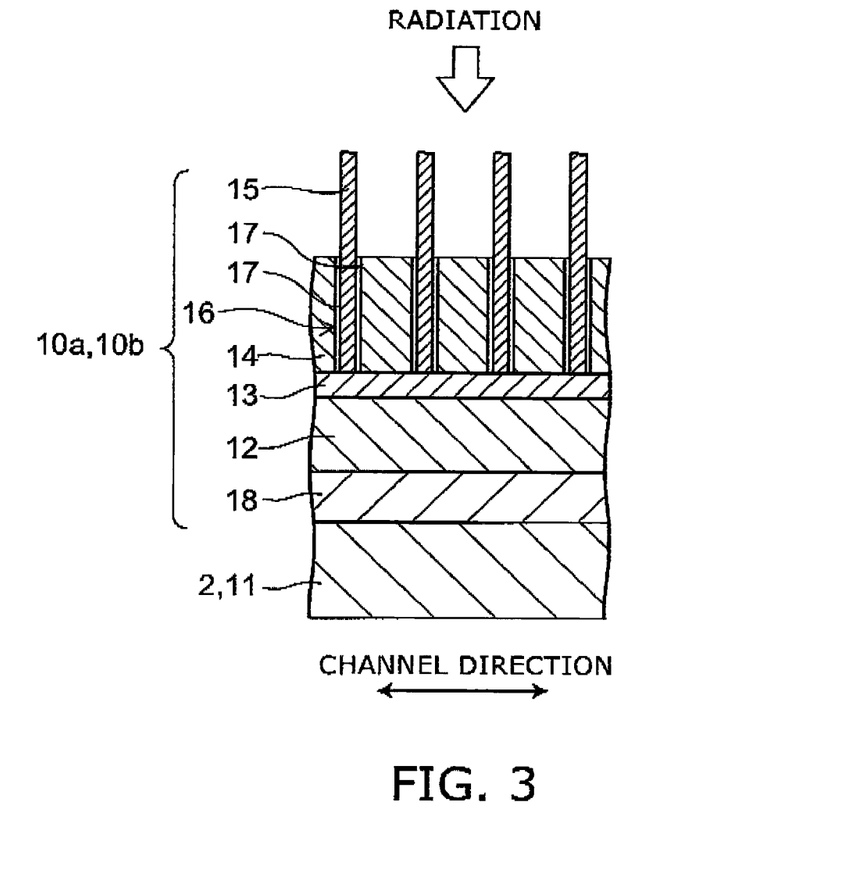
FIG. 3 is a schematic cross-sectional view for illustrating the radiation detection unit.

FIG. 3 is a schematic cross-sectional view for illustrating the radiation detection unit. It is noted that FIG. 3 is a cross-sectional view as viewed in the direction of arrows A-A in FIG. 2.

As shown in FIG. 3, the radiation detection unit 10a, 10b illustratively includes a photoelectric conversion means 12 having numerous photoelectric conversion elements, a bonding layer 13, a scintillator 14, collimator plates 15, and a circuit substrate 18. The arrow in the figure indicates the incidence direction of radiation.

The scintillator 14 is partitioned in accordance with the detection compartments of the photoelectric conversion elements, and a groove 16 is formed between the detection compartments. That is, each compartment of the scintillator 14 is separated by the grooves 16. Furthermore, the photoelectric conversion means 12 having numerous photoelectric conversion elements is also partitioned in accordance with the compartments of the scintillator 14. The scintillator 14 and the photoelectric conversion means 12 are bonded together via the bonding layer 13 so that the compartments thereof correspond to each other. The bonding layer 13 is illustratively made of a transparent adhesive so as to allow good transmission of light between the scintillator 14 and the photoelectric conversion means 12 which are bonded together. Thus, each compartment of the scintillator 14 is opposed to and joined to a light receiving section of the photoelectric conversion element, not shown, of the photoelectric conversion means 12 via the transparent bonding layer 13.

The circuit substrate 18 is joined to the surface of the photoelectric conversion means 12 on the opposite side of the surface to which the scintillator 14 is bonded. The circuit substrate 18 is also partitioned in accordance with the compartments of the scintillator 14 so as to be capable of receiving an electrical signal for each compartment. The circuit substrate 18 can also include, for example, an amplifier and an AD converter, not shown.

The collimator plate 15 is inserted in the groove 16 between the compartments of the scintillator 14. Furthermore, a diaphragm layer 17 is provided between the groove 16 and the collimator plate 15. The diaphragm layer 17 is illustratively made of a white adhesive and serves for optical separation and reflection between the above compartments of the scintillator 14 to prevent optical crosstalk between the compartments. It is noted that the diaphragm layer 17 is not limited to being made of a white adhesive, but may illustratively be formed by insertion or adhesion of a white plate-like body.

The scintillator 14 generates fluorescence upon receipt of X-ray or other radiation. The fluorescence is illustratively visible or other light. The maximum emission wavelength, decay time, reflection coefficient, density, optical power ratio, and the temperature dependence of fluorescence efficiency, for example, of the scintillator 14 depend on its material. Thus, the material can be selected in accordance with the characteristics of the intended application. The scintillator 14 used in an X-ray CT (computer tomography) apparatus can illustratively be a ceramic scintillator made of a sintered body of rare earth oxysulfide. However, the invention is not limited thereto, but other materials can be suitably selected.

The photoelectric conversion element provided in the photoelectric conversion means 12 can illustratively be a silicon photodiode having the pin structure. The photoelectric conversion element receives output light of the corresponding compartment of the scintillator 14 and converts it to an electrical signal. It is noted that the photoelectric conversion means 12 is not limited to being provided with silicon photodiodes, but it is possible to suitably select a means for converting the output light of the scintillator 14 to an electrical signal (such as CCD (charge coupled device)).

The collimator plate 15 serves to control X-ray or other radiation incident on each compartment of the scintillator and absorb scattered radiation to reduce crosstalk due to the scattered radiation. The collimator plate can be illustratively made of W (tungsten), Mo (molybdenum), Ta (tantalum), Pb (lead), or an alloy containing at least one of these metals. However, the invention is not limited thereto, but other materials can be suitably selected.

For convenience of description, in the foregoing, one end of the collimator plate 15 is illustratively inserted in the groove 16 provided in the scintillator 14. However, the invention is not limited thereto. For example, a white adhesive or the like can be filled in the groove 16 to serve as a diaphragm, and the collimator plate 15 can be provided so as to face the end surface of this diaphragm. That is, the collimator plate 15 can be disposed separately from the radiation detector.

Next, the effect of temperature variation is illustrated.

As the ambient temperature varies, each component of the radiation detector 20 expands or shrinks. Here, because the linear expansion coefficient of each component is different, a difference occurs in the amount of expansion or shrinkage associated with temperature variation. Here, in the radiation detection unit 10a, 10b itself, the components are joined by adhesion, and hence there is little danger of positional displacement between the components. However, because the radiation detection unit 10a, 10b is attached to the base plate 11 with the attachment screws 8, the attachment position may be displaced between the radiation detection unit 10a, 10b and the base plate 11.

Figure 4:
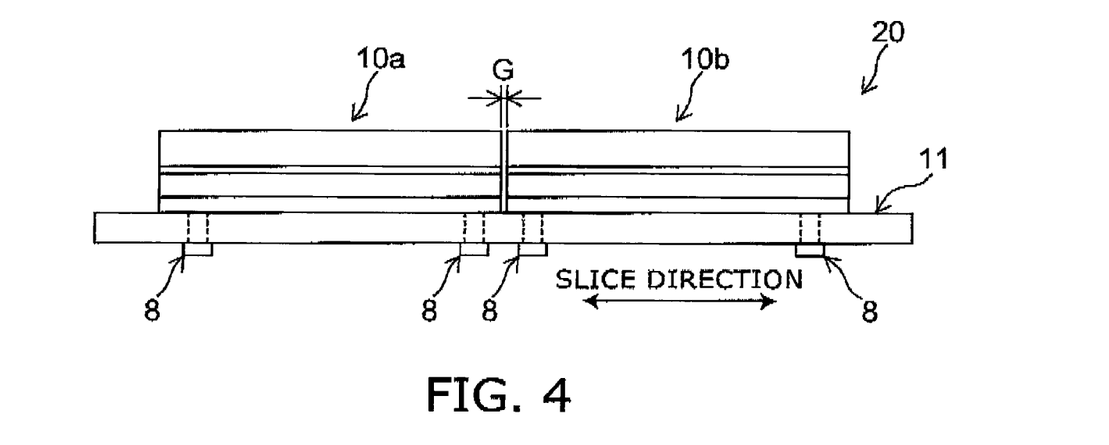
FIG. 4 is a schematic view for illustrating the positional displacement (occurrence of a gap) of the radiation detection units.

FIG. 4 is a schematic view for illustrating the positional displacement (occurrence of a gap) of the radiation detection units 10a, 10b.

As the ambient temperature varies, the radiation detection units 10a, 10b and the base plate 11 expand or shrink. Here, for example, if the base plate 11 is made of a material having a larger liner expansion coefficient than the radiation detection unit 10a, 10b, the amount of shrinkage of the base plate 11 is larger when the ambient temperature decreases (at the time of shrinkage). Then, with the shrinkage of the base plate 11, the radiation detection units 10a, 10b attached thereto are also about to move in that shrinking direction (toward the center of the base plate 11). However, because the end surfaces of the radiation detection units 10a, 10b in the slice direction abut each other, such movement is inhibited, whereas the frictional force (joint strength) between the attachment screw 8 and the base plate 11 cannot resist, and positional displacement may occur between the attachment screw 8 and the base plate 11. Then, if the ambient temperature increases (returns to normal), the radiation detection unit 10a and the radiation detection unit 10b move away from each other with the position remaining displaced. Hence, as shown in FIG. 4, a gap G occurs between the end surfaces of the radiation detection units 10a, 10b in the slice direction.

If the base plate 11 is made of a material having a smaller linear expansion coefficient than the radiation detection unit 10a, 10b, positional displacement occurs between the attachment screw 8 and the base plate 11 when the ambient temperature increases (at the time of expansion), and a gap G occurs when the ambient temperature decreases. The positional displacement between the attachment screw 8 and the base plate 11 may occur also in the channel direction (thickness direction of the page of FIG. 4) in addition to the slice direction.

Thus, even if the radiation detection unit 10a, 10b is positioned and attached at a prescribed position during manufacturing, the radiation detection units 10a, 10b may be displaced from the prescribed position and produce a gap, depending on the ambient temperature at which it is attached to the X-ray CT apparatus and actually used, or the ambient temperature at the time of transportation of the apparatus.

Such positional displacement or a gap may occur over time due to repeated variations in the ambient temperature, or may occur due to a few occurrences of temperature variation. Furthermore, as the number of radiation detection units disposed in the slice direction is increased for rapid and high-definition photographing in a wide area, the positional displacement and gap associated with temperature variation may be more likely to occur.

Here, in an X-ray CT apparatus including a radiation detector, the amount of X-ray radiation for each compartment is converted to an electrical signal, which is used to calculate (reconstruct) a tomographic image. Thus, if the radiation detection units 10a, 10b are displaced from the prescribed position or produce a gap, artifacts and the like occur in the reconstructed CT image and degrade the image quality.

As a result of investigations, the inventor has discovered that if a buffer section for absorbing the force generated by the difference in the amount of thermal expansion or shrinkage is provided at the junction between the radiation detection unit and the base plate, the positional displacement and gap of the radiation detection units associated with temperature variation can be avoided.

Next, returning to FIG. 1, the radiation detector 1 according to the embodiment of the invention is described.

As shown in FIG. 1A, the radiation detector 1 includes a base plate 2 and radiation detection units 10a, 10b provided on one major surface of the base plate 2 and configured to output an electrical signal proportional to the intensity of radiation. Furthermore, as shown in FIG. 1B, the base plate 2 includes attachment holes 11a for attaching the radiation detection units 10a, 10b.

That is, the attachment holes 11a for joining the base plate 2 and the radiation detection units are provided at the junction between the base plate 2 and the radiation detection units. The attachment holes 11a are provided on a line passing through generally the center of the width (channel direction) of the base plate 2. Attachment screws 8 inserted in the attachment holes 11a are screwed into the attachment sections, not shown, of the radiation detection units 10a, 10b so that the radiation detection units 10a, 10b are attached to the base plate 2. Furthermore, the radiation detection units 10a, 10b are attached so that the end surfaces of the radiation detection units 10a, 10b adjoining in the slice direction are in close contact with each other.

The base plate 2 further includes attachment holes 11b for attaching the radiation detector 1 illustratively to a two-dimensional detector system 103 (see FIG. 13) described later.

Furthermore, buffer sections 3a, 3b are provided near the ends of the base plate 2 in the slice direction. That is, the buffer sections are provided at least near the longitudinal ends of the base plate 2. Each of the buffer sections 3a, 3b provided near the longitudinal ends of the base plate 2 includes one attachment hole 11a for joining the base plate 2 and the radiation detection unit 10a, 10b.

One of the attachment holes 11a for attaching the radiation detection unit 10a to the base plate 2 is provided in the buffer section 3a, and one of the attachment holes 11a for attaching the radiation detection unit 10b to the base plate 2 is provided in the buffer section 3b. The buffer sections 3a, 3b are configured as a combination of a plurality of holes penetrating through the thickness of the base plate 2.

That is, the buffer sections 3a, 3b are provided at the junction between the base plate 2 and the radiation detection units 10a, 10b, and serve to absorb the stress generated at the junction due to temperature variation. A plurality of buffer sections are provided along the longitudinal direction of the base plate 2, at least near the longitudinal ends of the base plate 2. Absorption of the stress generated at the junction due to temperature variation is described later.

Next, the buffer section 3a, 3b is illustrated.

Figure 5:
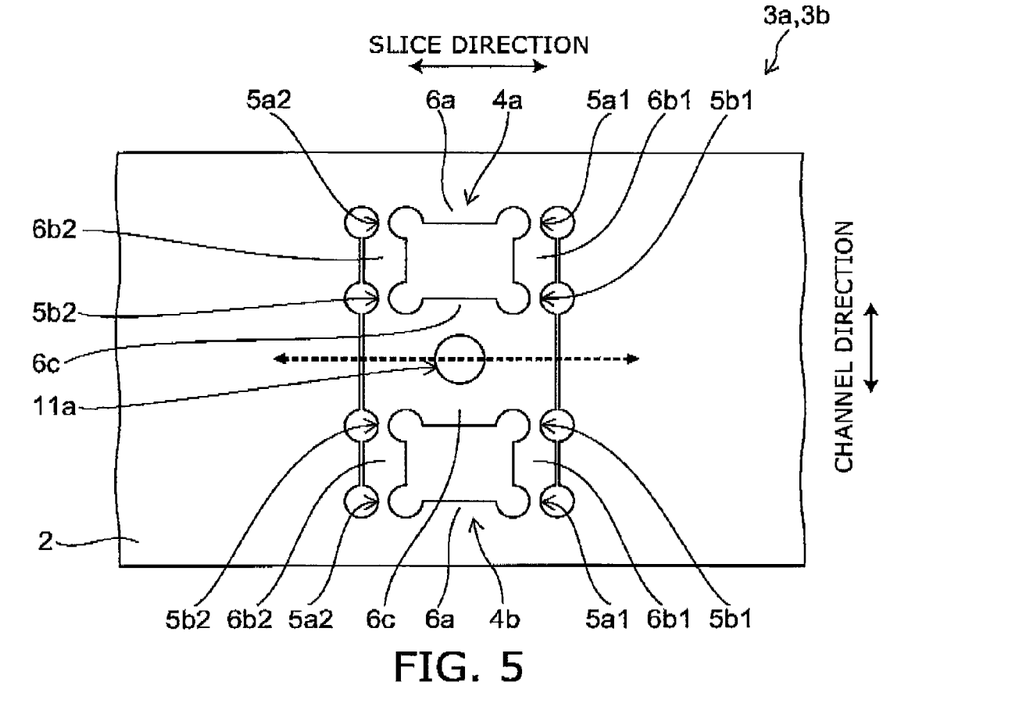
FIG. 5 is a schematic view for illustrating the buffer section.

FIG. 5 is a schematic view for illustrating the buffer section.

As shown in FIG. 5, the buffer section 3a, 3b includes a first buffer region 4a and a second buffer region 4b.

That is, the buffer section 3a, 3b includes buffer regions which are elastically deformable to absorb the stress generated at the junction due to temperature variation.

The first buffer region 4a and the second buffer region 4b are provided at positions generally symmetric with respect to the attachment hole 11a.

That is, the first buffer region 4a and the second buffer region 4b are provided at positions generally symmetric with respect to the line segment connecting between the centers of the attachment holes 11a provided for joining the base plate 2 and the radiation detection units 10a, 10b.

The first buffer region 4a and the second buffer region 4b include deformation sections 5a (5a1, 5a2), 5b (5b1, 5b2) penetrating through the thickness of the base plate 2. Each of these deformation sections 5a1, 5a2, 5b1, 5b2 is a thin-walled section formed between a pair of holes penetrating through the base plate 2. The dimension (wall thickness) of the deformation section 5a1, 5a2, 5b1, 5b2 in the slice direction is thinned to facilitate elastic deformation in the bending direction (slice direction) of the junction.

Here, the deformation sections 5a (5a1, 5a2) are provided on the outer edge side of the base plate 2, and the deformation sections 5b (5b1, 5b2) are provided on the center side of the base plate 2.

The deformation sections 5a1, 5a2, 5b1, 5b2 are provided at the vertex positions of a quadrangle, which has a node 6a between the deformation section 5a1 and the deformation section 5a2, a node 6b1 between the deformation section 5a1 and the deformation section 5b1, a node 6b2 between the deformation section 5a2 and the deformation section 5b2, and a node 6c between the deformation section 5b1 and the deformation section 5b2. These nodes 6a, 6b1, 6b2, 6c are formed thicker (with regard to the thickness as viewed parallel to the major surface of the base plate 2) than the deformation sections 5a1, 5a2, 5b1, 5b2. That is, the thin-walled (with regard to the thickness as viewed parallel to the major surface of the base plate 2) deformation sections 5a1, 5a2, 5b1, 5b2 are provided on both sides of the thick-walled nodes (6a, 6b1, 6b2, 6c).

The node 6a is provided generally parallel to the line segment connecting between generally the centers of the attachment holes 11a of the radiation detection unit 10a or the radiation detection unit 10b, and the node 6c, which has the same length as the node 6a, is provided generally parallel to the node 6a. The node 6b1 and the node 6b2 have the same length and are provided generally parallel to each other.

That is, the first buffer region 4a and the second buffer region 4b include a node 6a, a node 6b1 provided in a direction crossing the node 6a, a node 6c provided generally parallel to the node 6a, a node 6b2 provided generally parallel to the node 6b1, a deformation section 5a1 provided between a first end of the node 6a and a first end of the node 6b1 and being elastically deformable in the bending direction (slice direction), a deformation section 5b1 provided between a second end of the node 6b1 and a first end of the node 6c and being elastically deformable in the bending direction (slice direction), a deformation section 5b2 provided between a second end of the node 6c and a first end of the node 6b2 and being elastically deformable in the bending direction (slice direction), and a deformation section 5a2 provided between a second end of the node 6a and a second end of the node 6b2 and being elastically deformable in the bending direction (slice direction).

If the ambient temperature varies as described above, a force is applied to the attachment hole 11a portion, which is the junction between the radiation detection unit and the base plate. Furthermore, if a force is applied to the attachment hole 11a portion, the deformation sections 5a1, 5a2, which have low rigidity and are disposed remote from the attachment hole 11a joint of application of the force), are elastically deformed in the bending direction (slice direction). With the elastic deformation of the deformation sections 5a1, 5a2, the positions of the nodes connected thereto move. However, the position of the node 6a having the highest rigidity is left unchanged, whereas the positions of the nodes 6b1, 6b2 move. Furthermore, through the intermediary of the deformation sections 5b1, 5b2, the position of the node 6c connected to the nodes 6b1, 6b2 also moves.

Here, because of the above relationship among the nodes 6a, 6b1, 6b2, 6c, a so-called parallel linkage is formed from the deformation sections 5a1, 5a2, 5b1, 5b2 and the nodes 6a, 6b1, 6b2, 6c, allowing the nodes 6c to move generally parallel to the slice direction. Furthermore, because the first buffer region 4a and the second buffer region 4b are provided at positions generally symmetric with respect to the attachment hole 11a, the components of the force acting in directions other than the slice direction are canceled out. Hence, as indicated by the dashed arrow in the figure, the attachment hole 11a can be moved on the line passing through generally the center of the width (channel direction) of the base plate 2. That is, the attachment hole 11a can be displaced in the slice direction from the original attachment position. It is noted that although the node 6c constituting the parallel linkage is prevented from moving in the channel direction, this is compensated by the elongation of the deformation sections 5a1, 5a2, 5b1, 5b2, which are elastically deformed.

If the ambient temperature returns to normal and the force applied to the attachment hole 11a portion vanishes, then the attachment hole 11a is returned to the original position by the elastic force of the deformation sections 5a1, 5a2, 5b1, 5b2.

It is noted that the dimension of the deformation section 5a, 5b in the slice direction can be suitably modified in view of the amount of expansion or shrinkage associated with temperature variation. Furthermore, the angle and length, for example, of the nodes are not limited to the above illustration as long as they form a parallelogram.

According to this embodiment, the force generated by the difference in the amount of thermal expansion or shrinkage can be absorbed by elastic deformation of the first buffer region 4a and the second buffer region 4b. Thus, the positional displacement between the attachment screw 8 and the base plate 2 can be prevented, and hence the positional displacement and gap of the radiation detection units can be avoided.

Furthermore, because the attachment hole 11a can be moved parallel to the slice direction from the original position, the positional displacement in the channel direction can also be prevented.

Furthermore, as shown in FIG. 1b, one of the attachment holes 11a for attaching the radiation detection unit is provided in the buffer section. Hence, the attachment hole 11a provided outside the buffer section can be used as a reference. Here, the attachment holes 11a provided outside the buffer sections (the attachment holes 11a used as a reference) are provided nearer to the end surfaces of the radiation detection units 10a, 10b which are in close contact with each other. Hence, no positional movement occurs near the end surfaces in close contact, and no gap occurs between the radiation detection units 10a, 10b.

Furthermore, an X-ray CT apparatus provided with the radiation detector 1 according to this embodiment can produce a high-quality image free from artifacts and the like.

Figure 6A:
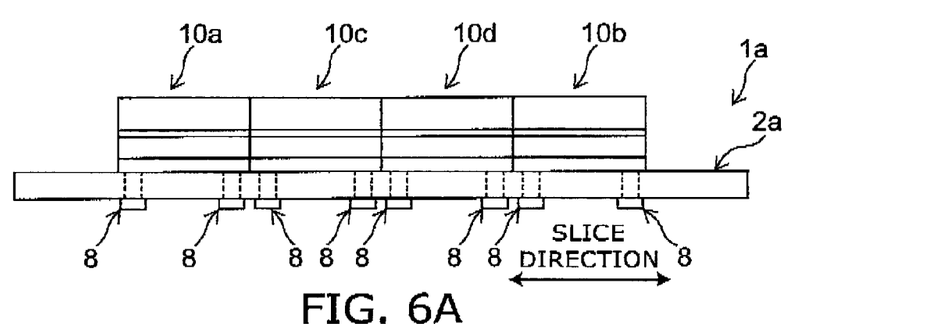
FIGS. 6A and 6B are schematic views for illustrating a radiation detector according to another embodiment of the invention.
Figure 6B:
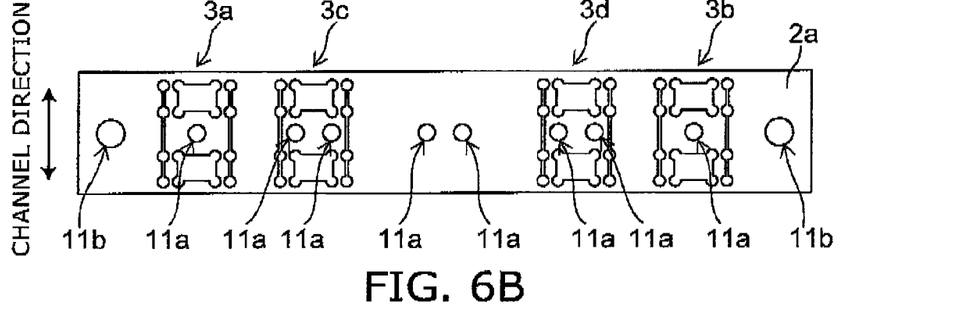

FIG. 6 is a schematic view for illustrating a radiation detector according to another embodiment of the invention. More specifically, FIG. 6A is a schematic front view of the radiation detector, and FIG. 6B is a schematic plan view of a base plate.

As shown in FIG. 6A, the radiation detector 1a according to this embodiment includes a base plate 2a and radiation detection units 10a, 10b, 10c, 10d provided on one major surface of the base plate 2a.

Furthermore, as shown in FIG. 6B, the base plate 2a includes attachment holes 11a for attaching the radiation detection units 10a, 10b, 10c, 10d. The base plate 2a further includes attachment holes 11b for attaching the radiation detector 1a illustratively to a two-dimensional detector system 103 (see FIG. 13) described later. Furthermore, the base plate 2a includes buffer sections 3a, 3b, 3c, 3d. More specifically, the buffer sections are provided at least near the longitudinal ends of the base plate 2a. Each of the buffer sections 3a, 3b provided near the longitudinal ends of the base plate 2a includes one attachment hole 11a for joining the base plate 2a and the radiation detection unit 10a, 10b.

A plurality of radiation detection units 10a-10d are provided in series with the longitudinal end surfaces abutting each other, and the buffer section is not provided at least near one of the plurality of abutting portions. The buffer section 3c, 3d provided near the abutting portion includes two attachment holes 11a for joining the base plate 2a and the radiation detection unit 10a-10d.

Here, preferably, among the buffer sections 3a, 3b, 3c, 3d, the buffer sections 3a, 3b disposed on the end side are more elastically deformable than the buffer sections 3c, 3d disposed on the center side. Then, smooth movement is allowed also on the end side, where the effect of thermal expansion or shrinkage is greater. Elastic deformability of the buffer section can be adjusted by modifying, for example, the dimension of the above deformation sections 5a1, 5a2, 5b1, 5b2 in the slice direction.

One of the attachment holes 11a for attaching the radiation detection unit 10a to the base plate 2a is provided in the buffer section 3a, and the other is provided in the buffer section 3c. One of the attachment holes 11a for attaching the radiation detection unit 10b to the base plate 2a is provided in the buffer section 3b, and the other is provided in the buffer section 3d. One of the attachment holes 11a for attaching the radiation detection unit 10c to the base plate 2a is provided in the buffer section 3c. One of the attachment holes 11a for attaching the radiation detection unit 10d to the base plate 2a is provided in the buffer section 3d.

The radiation detection units 10c, 10d can have the same configuration as the radiation detection units 10a, 10b, and hence the description thereof is omitted. Likewise, the buffer sections 3c, 3d can have the same configuration as the buffer sections 3a, 3b, and hence the description thereof is omitted.

This embodiment can also achieve the same effect as illustrated with reference to FIGS. 1 and 5.

Furthermore, as shown in FIG. 6B, one of the attachment holes 11a for attaching the radiation detection unit 10c, 10d is provided in the buffer section. Hence, the attachment hole 11a provided outside the buffer section can be used as a reference. Here, the attachment holes 11a provided outside the buffer sections (the attachment holes 11a used as a reference) are provided nearer to the end surfaces of the radiation detection units 10c, 10d which are in close contact with each other. Hence, no positional movement occurs near the end surfaces in close contact, and no gap occurs between the radiation detection units 10c, 10d.

Furthermore, one of the attachment holes 11a for attaching the radiation detection unit 10a, 10c to the base plate 2a is provided in the buffer section 3c. Here, because the attachment holes 11a for bringing into close contact the end surfaces of the radiation detection unit 10a and the radiation detection unit 10c are both provided in the buffer section 3c, they are moved, if any, while keeping close contact. Hence, no gap occurs between the radiation detection units 10a, 10c.

Furthermore, one of the attachment holes 11a for attaching the radiation detection unit 10b, 10d to the base plate 2a is provided in the buffer section 3d. Here, because the attachment holes 11a for bringing into close contact the end surfaces of the radiation detection unit 10b and the radiation detection unit 10d are both provided in the buffer section 3d, they are moved, if any, while keeping close contact. Hence, no gap occurs between the radiation detection units 10b, 10d.

Figure 7A:
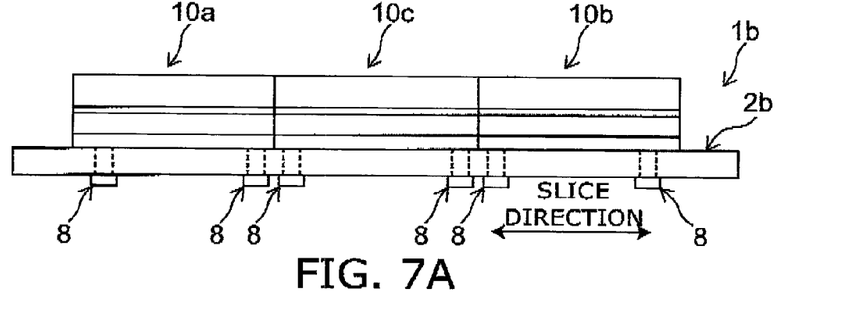
FIGS. 7A and 7B are schematic views for illustrating a radiation detector according to another embodiment of the invention.
Figure 7B:
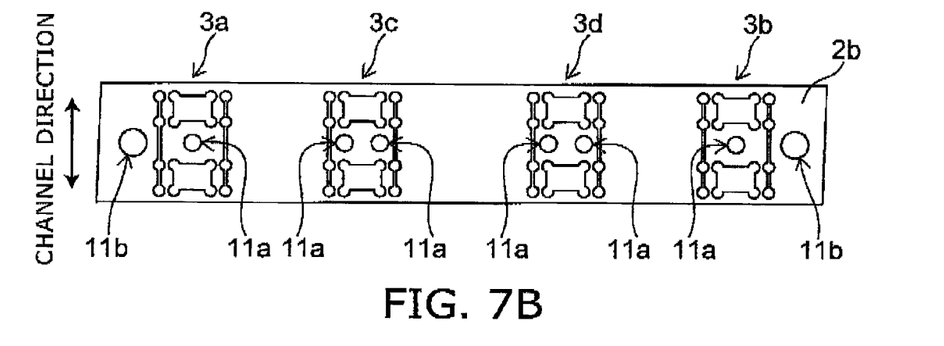

FIG. 7 is a schematic view for illustrating a radiation detector according to another embodiment of the invention. More specifically, FIG. 7A is a schematic front view of the radiation detector, and FIG. 7B is a schematic plan view of a base plate.

As shown in FIG. 7A, the radiation detector 1b according to this embodiment includes a base plate 2b and radiation detection units 10a, 10b, 10c provided on one major surface of the base plate 2b.

Furthermore, as shown in FIG. 7B, the base plate 2b includes attachment holes 11a for attaching the radiation detection units 10a, 10b, 10c. The base plate 2b further includes attachment holes 11b for attaching the radiation detector 1b illustratively to a two-dimensional detector system 103 (see FIG. 13) described later. Furthermore, the base plate 2b includes buffer sections 3a, 3b, 3c, 3d. More specifically, the buffer sections 3a-3d are provided at all the junctions between the base plate 2b and the radiation detection units 10a-10c. Each of the buffer sections 3a, 3b provided near the longitudinal ends of the base plate 2b includes one attachment hole 11a for joining the base plate 2b and the radiation detection unit 10a, 10b. Furthermore, the buffer section 3c, 3d provided near the abutting portion includes two attachment holes 11a for joining the base plate 2b and the radiation detection unit 10a-10c.

One of the attachment holes 11a for attaching the radiation detection unit 10a to the base plate 2b is provided in the buffer section 3a, and the other is provided in the buffer section 3c. One of the attachment holes 11a for attaching the radiation detection unit 10b to the base plate 2b is provided in the buffer section 3b, and the other is provided in the buffer section 3d. One of the attachment holes 11a for attaching the radiation detection unit 10c to the base plate 2b is provided in the buffer section 3c, and the other is provided in the buffer section 3d.

The radiation detection unit 10c can have the same configuration as the radiation detection units 10a, 10b, and hence the description thereof is omitted. Likewise, the buffer sections 3c, 3d can have the same configuration as the buffer sections 3a, 3b, and hence the description thereof. Is omitted.

This embodiment can also achieve the same effect as illustrated with reference to FIGS. 1 and 5.

One of the attachment holes 11a for attaching the radiation detection unit 10a, 10c to the base plate 2b is provided in the buffer section 3c. One of the attachment holes 11a for attaching the radiation detection unit 10b, 10c to the base plate 2b is provided in the buffer section 3d.

Here, as described above, the radiation detection unit 10a and the radiation detection unit 10c are moved, if any, while keeping close contact between the end surfaces thereof. Furthermore, the radiation detection unit 10b and the radiation detection unit 10c are moved, if any, while keeping close contact between the end surfaces thereof. Hence, no gap occurs between the radiation detection unit 10a and the radiation detection unit 10c, and between the radiation detection unit 10b and the radiation detection unit 10c.

Figure 8A:
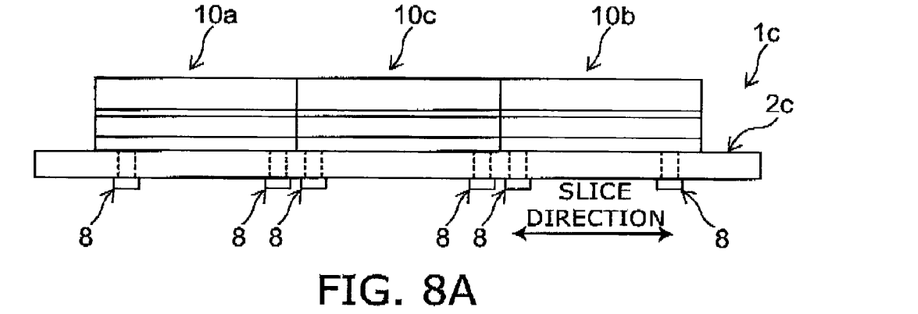
FIGS. 8A and 8B are schematic views for illustrating a radiation detector according to another embodiment of the invention.
Figure 8B:
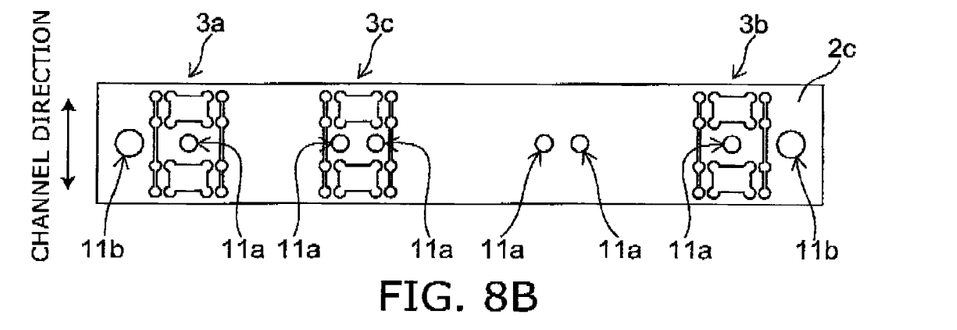

FIG. 8 is a schematic view for illustrating a radiation detector according to another embodiment of the invention. More specifically, FIG. 8A is a schematic front view of the radiation detector, and FIG. 8B is a schematic plan view of a base plate.

As shown in FIG. 8A, the radiation detector 1c according to this embodiment includes a base plate 2c and radiation detection units 10a, 10b, 10c provided on one major surface of the base plate 2c.

Furthermore, as shown in FIG. 8B, the base plate 2c includes attachment holes 11a for attaching the radiation detection units 10a, 10b, 10c. The base plate 2c further includes attachment holes 11b for attaching the radiation detector 1c illustratively to a two-dimensional detector system 103 (see FIG. 13) described later. Furthermore, the base plate 2c includes buffer sections 3a, 3b, 3c. More specifically, the buffer sections are provided at least near the longitudinal ends of the base plate 2c. Each of the buffer sections 3a, 3b provided near the longitudinal ends of the base plate 2c includes one attachment hole 11a for joining the base plate 2c and the radiation detection unit 10a, 10b.

A plurality of radiation detection units 10a-10c are provided in series with the longitudinal end surfaces abutting each other, and the buffer sections are not provided at least near one of the plurality of abutting portions. The buffer section 3c provided near the abutting portion includes two attachment holes 11a for joining the base plate 2c and the radiation detection unit 10a, 10c.

One of the attachment holes 11a for attaching the radiation detection unit 10a to the base plate 2c is provided in the buffer section 3a, and the other is provided in the buffer section 3c. One of the attachment holes 11a for attaching the radiation detection unit 10b to the base plate 2c is provided in the buffer section 3b. One of the attachment holes 11a for attaching the radiation detection unit 10c to the base plate 2c is provided in the buffer section 3c.

The radiation detection unit 10c can have the same configuration as the radiation detection units 10a, 10b, and hence the description thereof is omitted. Likewise, the buffer section 3c can have the same configuration as the buffer sections 3a, 3b, and hence the description thereof is omitted.

This embodiment can also achieve the same effect as illustrated with reference to FIGS. 1 and 5.

One of the attachment holes 11a for attaching the radiation detection unit 10a, 10c to the base plate 2b is provided in the buffer section 3c. Here, as described above, the radiation detection unit 10a and the radiation detection unit 10c are moved, if any, while keeping close contact between the end surfaces thereof. Hence, no gap occurs between the radiation detection unit 10a and the radiation detection unit 10c.

Furthermore, like that illustrated in FIG. 6, the attachment holes 11a nearer to the end surfaces of the radiation detection units 10b, 10c which are in close contact with each other do not move. Hence, no gap occurs between the radiation detection units 10b, 10c.

Furthermore, like that illustrated in FIGS. 6 and 8, more preferably, the attachment hole 11a used as a reference (the attachment hole 11a that does not move in position) is provided, because it reduces the effect of variation in the elastic coefficient (variation in the elastic force) of each buffer section.

Figure 9A:
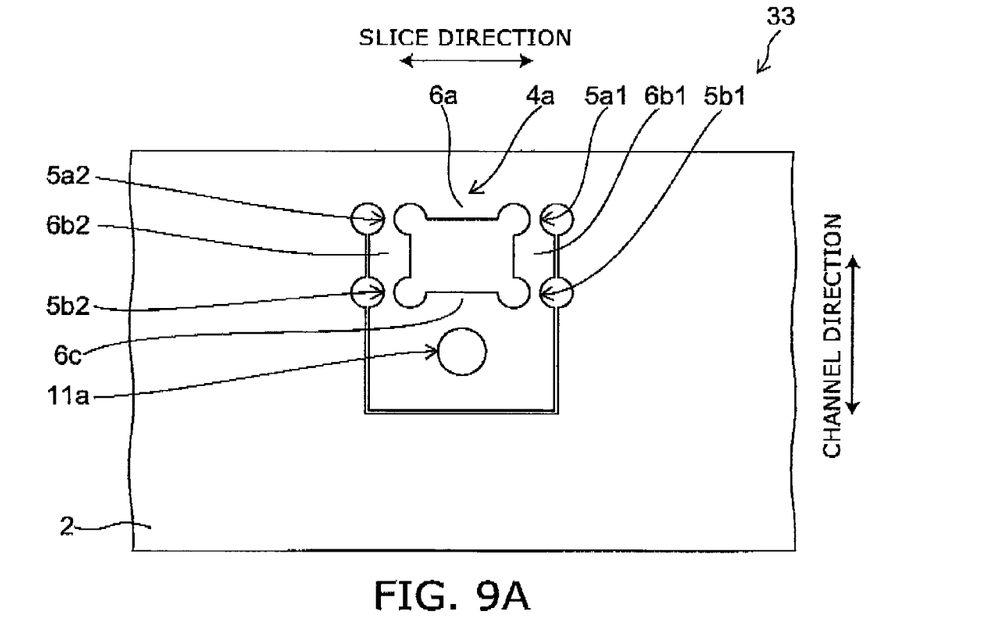
FIGS. 9A and 9B are schematic views for illustrating a buffer section according to another embodiment.
Figure 9B:
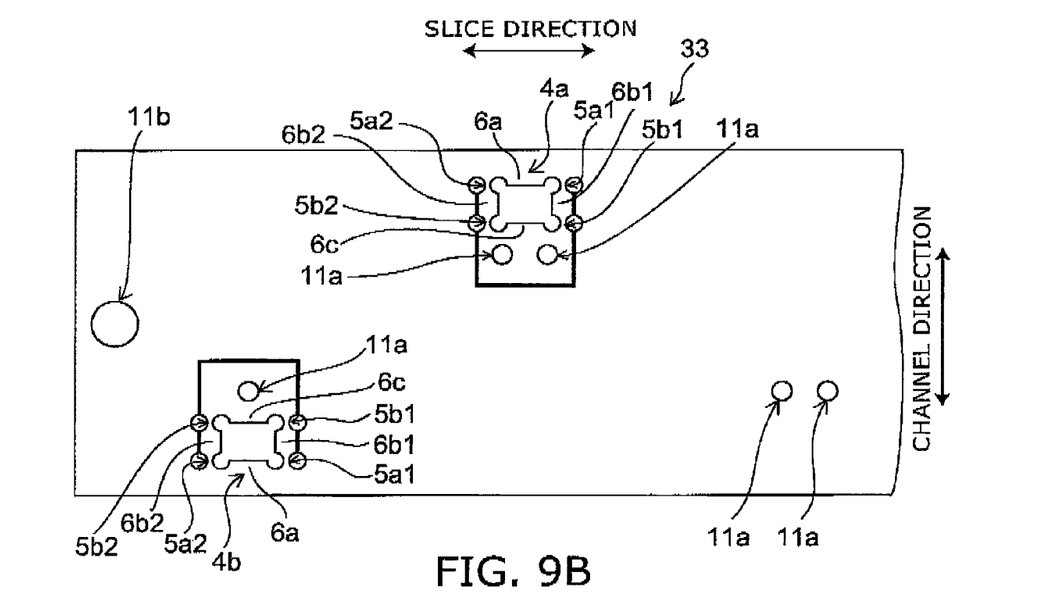
Figure 10:
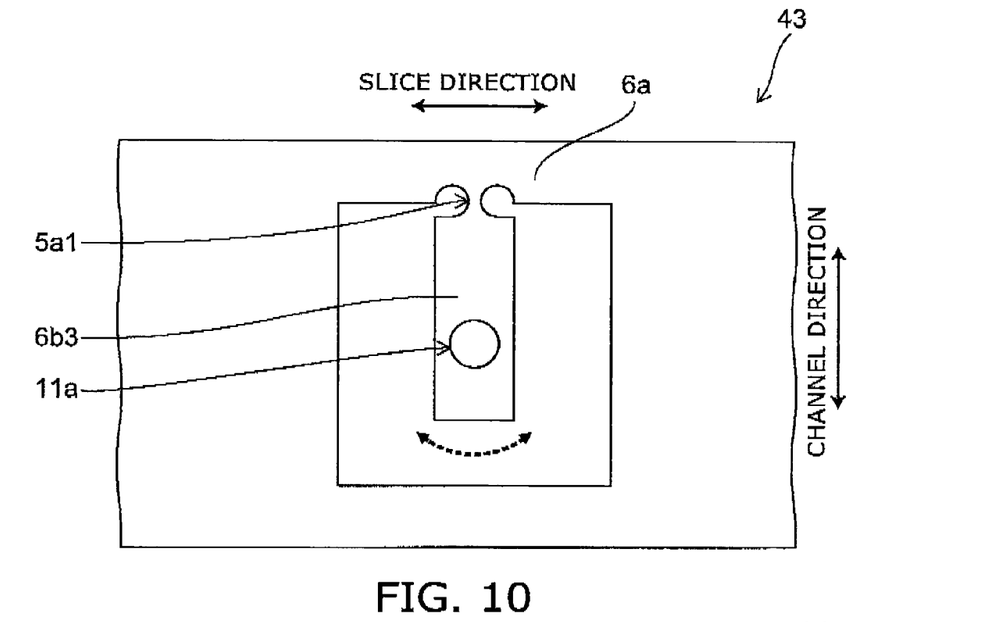
FIG. 10 is a schematic view for illustrating a buffer section according to another embodiment.

FIGS. 9 and 10 are schematic views for illustrating a buffer section according to another embodiment.

Of the first buffer region 4a and the second buffer region 4b illustrated in FIG. 5, the buffer section 33 includes only the first buffer region 4a as shown in FIG. 9A. This makes elastic deformation easier, and hence the movement can be further facilitated. It is noted that, alternatively, the buffer section can include only the second buffer region 4b.

Furthermore, as shown in FIG. 9B, it is also possible to provide a buffer section including only the first buffer region 4a and a buffer section including only the second buffer region 4b.

Here, in the case where the attachment sections, not shown, of the radiation detection unit are provided along the diagonal of the radiation detection unit, the buffer section including only the first buffer region 4a and the buffer section including only the second buffer region 4b can be provided alternately along the diagonal.

It is noted that the components of the force acting in directions other than the slice direction cannot be canceled out by the configuration of including only one of the first buffer region 4a and the second buffer region 4b. Hence, positional displacement may occur in the channel direction. However, this configuration can be used with small positional displacement in the channel direction if the amount of thermal expansion or shrinkage is small.

As shown in FIG. 10, the buffer section 43 has a node 6b3 with one end being a free end and the other end being provided with a deformation section 5a1.

More specifically, the buffer region 43 has a node 6a which has a large thickness as viewed parallel to the major surface of the base plate, a node 6b3 which is provided in a direction crossing the node 6a and has a large thickness as viewed parallel to the major surface of the base plate, and a deformation section 5a1 which is provided between the node 6a and one end of the node 6b3, has a small thickness as viewed parallel to the major surface of the base plate, and is elastically deformable in the bending direction.

Here, the attachment hole 11a is provided in the node 6b3. This makes elastic deformation easier, and hence the movement can be further facilitated.

In this configuration, the attachment hole 11a moves on an arc centered on the deformation section 5a1, and hence positional displacement may occur in the channel direction. However, this configuration can be used with small positional displacement in the channel direction if the amount of thermal expansion or shrinkage is small.

Figure 11A:
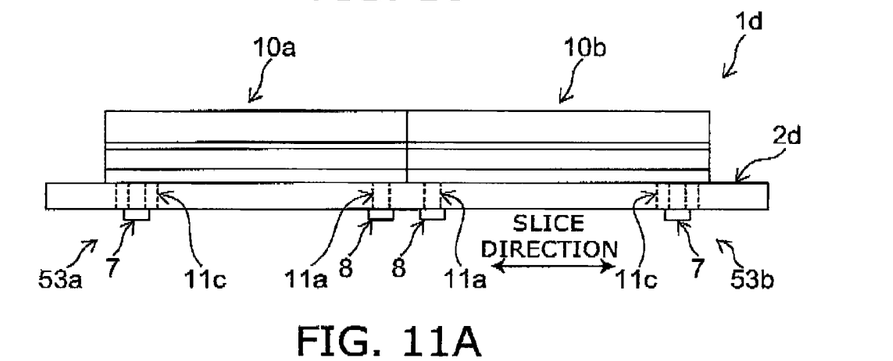
FIGS. 11A and 11B are schematic views for illustrating a buffer section according to another embodiment.
Figure 11B:
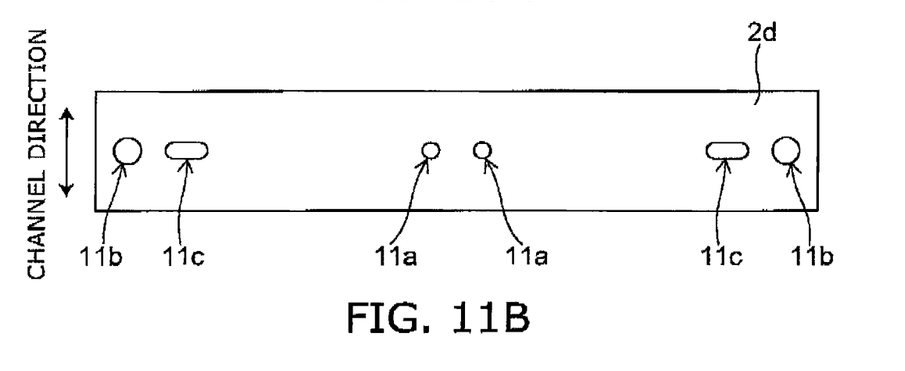

FIG. 11 is a schematic view for illustrating a buffer section according to another embodiment.

As shown in FIG. 11A, the radiation detector 1d includes a base plate 2d and radiation detection units 10a, 10b provided on one major surface of the base plate 2d. Furthermore, as shown in FIG. 11B, the base plate 2d includes attachment holes 11a for attaching the radiation detection units 10a, 10b. The attachment holes 11a are provided on a line passing through generally the center of the width (channel direction) of the base plate 2d.

The base plate 2d further includes attachment holes 11b for attaching the radiation detector 1d illustratively to a two-dimensional detector system 103 (see FIG. 13) described later.

Furthermore, buffer sections 53a, 53b are provided near the end surfaces of the base plate 2d in the slice direction. The buffer section 53a, 53b includes a guide hole 11c and a headed guide pin 7 serving as a sliding section.

That is, the buffer section 53a, 53b includes a sliding section (guide hole 11c, guide pin 7) which is slidable to absorb the stress generated at the junction due to temperature variation. A plurality of sliding sections are provided along the longitudinal direction of the base plate 2d, at least near the longitudinal ends of the base plate 2d.

The guide hole 11c shaped like an oblong hole is provided on a line passing through generally the center of the width (channel direction) of the base plate 2d.

Attachment screws 8 inserted in the attachment holes 11a are screwed into the attachment sections, not shown, of the radiation detection units 10a, 10b, and the headed guide pins 7 inserted in the guide holes 11c are screwed into the attachment sections, not shown, of the radiation detection units 10a, 10b so that the radiation detection units 10a, 10b are attached to the base plate 2d.

Furthermore, the radiation detection units 10a, 10b are attached so that the end surfaces of the radiation detection units 10a, 10b adjoining in the slice direction are in close contact with each other.

Even in the situation where the guide pin 7 is screwed into the attachment section, not shown, of the radiation detection unit 10a, 10b, the guide pin 7 is slidable in the guide hole 11c. That is, in the slice direction of the base plate 2d, the end surface side of the junction between the radiation detection units 10*a*, 10*b* and the base plate 2*d* is movable along the guide hole 11*c*.

Hence, even if the ambient temperature varies and causes thermal expansion or shrinkage, the guide pin 7 can slide in the guide hole 11*c*. Furthermore, like that illustrated in FIG. 6, the attachment holes 11*a* nearer to the end surfaces of the radiation detection units 10*a*, 10*b* which are in close contact with each other do not move. Hence, no gap occurs between the radiation detection units 10*a*, 10*b*.

Next, the function of the radiation detector 1 is illustrated.

X-ray or other radiation incident along the collimator plate 15 passes through the space formed between the collimator plates 15 and reaches the scintillator 14. Here, radiation incident from directions other than the direction along which the collimator plate 15 is disposed, that is, scattered radiation, is absorbed by the collimator plate 15, and hence does not reach the scintillator 14.

The radiation which has reached the scintillator 14 is converted to light having an intensity proportional to the intensity of the radiation. The converted light is repeatedly reflected at the surface of the diaphragm layer 17 and the interface between the scintillator 14 and the diaphragm layer 17, for example, and incident on the photoelectric conversion means 12.

The light incident on the photoelectric conversion means 12 is photoelectrically converted and outputted as an electrical signal having an intensity proportional to the intensity of the light.

As described above, the radiation detector 1 according to the present embodiments can avoid the positional displacement and gap of the radiation detection units despite any variation in the ambient temperature. Hence, an X-ray CT apparatus, for example, provided with the radiation detector 1 can avoid artifacts and the like and improve the image quality.

Here, even if the number of radiation detection units disposed in the slice direction is increased for rapid and high-definition photographing in a wide area, the positional displacement and gap of the radiation detection units can be effectively avoided.

Next, a method for manufacturing the radiation detector is illustrated.

First, a method for manufacturing the radiation detection unit is illustrated.

For convenience of description, the following illustration is based on a one-dimensional detector (one-dimensional array) in which grooves 16 (collimator plates 15) are aligned in the channel direction. However, the invention is not limited thereto, but is also applicable to a multi-detector (e.g., two-dimensional array) in which grooves (collimator plates) are arrayed in a matrix configuration.

First, a material of the scintillator 14 is selected in accordance with the purpose of the radiation detector; and the outline of the material is cut to form a block body. For example, the material of the scintillator 14 used in an X-ray CT apparatus can illustratively be a ceramic made of a sintered body of rare earth oxysulfide.

Next, the frontside and the backside, that is, the X-ray incidence surface and the bonding surface to be bonded to the photoelectric conversion means 12 are grounded by a grinder.

Next, grooves 16 are formed illustratively using a diamond cutter.

Here, in the case of a one-dimensional detector (one-dimensional array), grooves 16 are formed on a line in the channel direction. In the case of a multi-detector, grooves are formed in a matrix configuration. For example, in the case of a two-dimensional array, grooves are arrayed in the channel direction and the slice direction.

Next, the scintillator 14 and the photoelectric conversion means 12 are bonded together using a transparent adhesive so that the compartments thereof are matched with each other.

Here, the photoelectric conversion means 12 is bonded to the surface of the scintillator 14 on the opposite side of the surface on which radiation is incident.

Next, the photoelectric conversion means 12 and a circuit substrate 18 are joined, and interconnection between the photoelectric conversion means 12 and the circuit substrate 18 is made.

Next, one end of a collimator plate 15 is inserted in the groove 16 of the scintillator 14 and bonded thereto using a white adhesive.

Alternatively, as described above, a white adhesive or the like can be filled in the groove 16 to serve as a diaphragm, and the collimator plate 15 can be provided so as to face the end surface of this diaphragm. That is, the collimator plate 15 can be disposed separately from the radiation detector.

Thus, the radiation detector is manufactured.

Next, manufacturing of the base plate is illustrated.

First, the outline of a metal plate or the like is cut to form a block body.

Next, the buffer sections, attachment holes and the like described above are formed in the block body.

More specifically, junctions (attachment holes 11*a*) with the radiation detection unit, and buffer sections for absorbing the stress generated at the junctions due to temperature variation are formed. The attachment holes 11*b* and the like are also formed as appropriate. As described above, at least one or more of the junctions (attachment holes 11*a*) are formed in the buffer sections. In the case of the buffer section 53*a*, 53*b* illustrated in FIG. 11, the guide hole 11*c* also serves as a junction with the radiation detection unit.

Here, for example, the buffer section 3*a*, 3*b* having deformation sections 5*a*1, 5*a*2, 5*b*1, 5*b*2 illustrated in FIG. 5 can be formed into a desired shape by electrical discharge machining. The guide hole 11*c* and the attachment hole 11*a*, 11*b* of the buffer section 53*a*, 53*b* illustrated in FIG. 11 can be formed by cutting work.

Thus, the base plate is manufactured.

Next, the radiation detection unit is attached to the base plate. For example, in the case of the radiation detector 1 illustrated in FIG. 1, attachment screws 8 inserted in the attachment holes 11*a* are screwed into the attachment sections, not shown, of the radiation detection units 10*a*, 10*b* so that the radiation detection units 10*a*, 10*b* are attached to the base plate 2. In the case of the radiation detector 1*d* illustrated in FIG. 11, attachment screws 8 inserted in the attachment holes 11*a* are screwed into the attachment sections, not shown, of the radiation detection units 10*a*, 10*b*, and the headed guide pins 7 inserted in the guide holes 11*c* are screwed into the attachment sections, not shown, of the radiation detection units 10*a*, 10*b* so that the radiation detection units 10*a*, 10*b* are attached to the base plate 2*d*.

That is, at least one or more of the junctions, the radiation detection unit is attached to the base plate via the buffer section.

Thus, the radiation detector is manufactured.

Next, an X-ray CT apparatus according to an embodiment of the invention is illustrated.

For convenience of description, the following illustration is based on an X-ray CT apparatus provided with the radiation detector 1 according to the above embodiment. However, the same also applies to those illustratively provided with the radiation detectors 1*a*, 1*b*, 1*c*, 1*d*.

Figure 12:
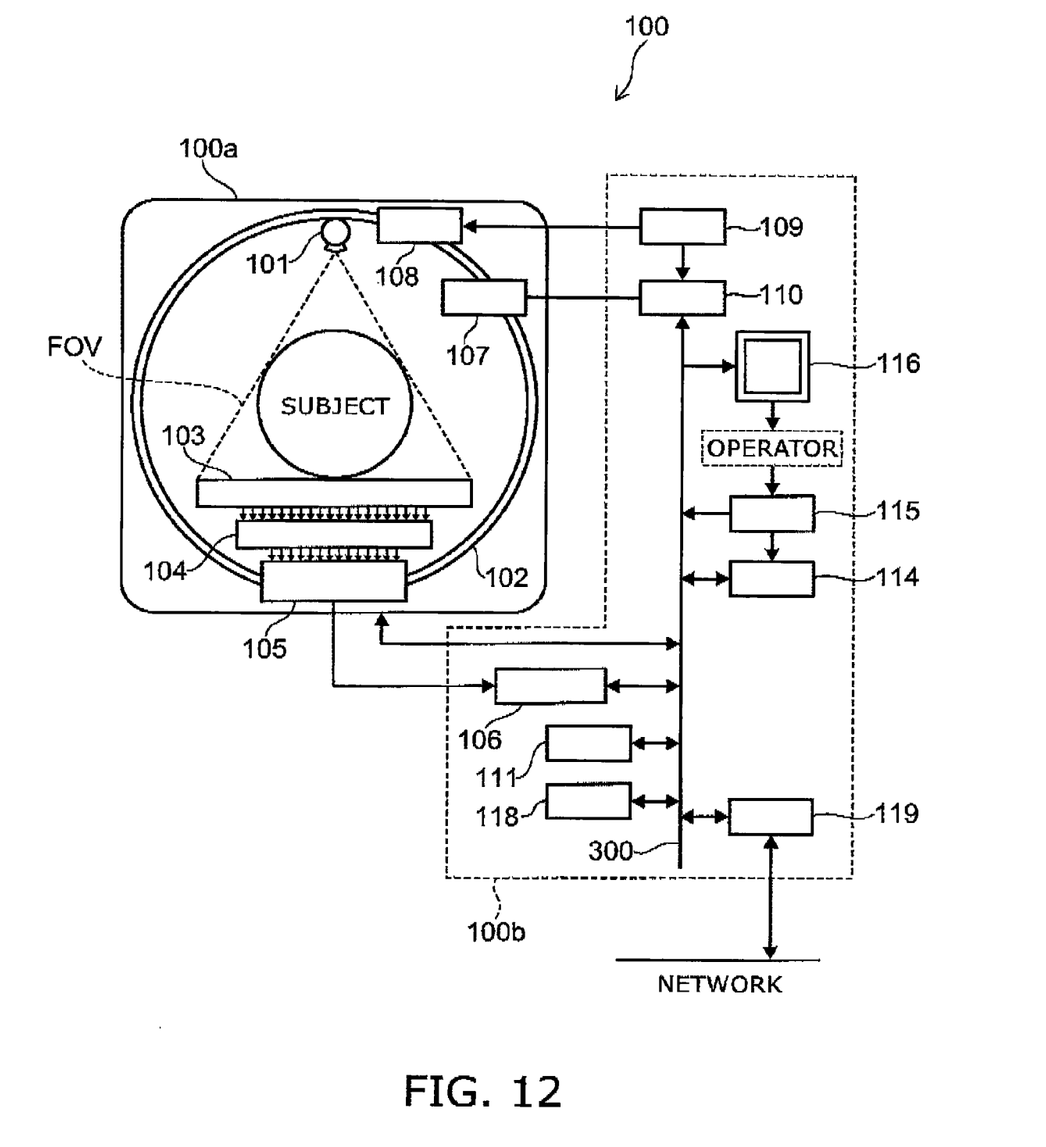
FIG. 12 is a schematic block diagram for illustrating the general configuration of the X-ray CT apparatus.

FIG. 12 is a schematic block diagram for illustrating the general configuration of the X-ray CT apparatus.

As shown in FIG. 12, the X-ray CT apparatus 100 includes a photographing means 100a and a processing/displaying means 100b.

The photographing means 100a exposes a subject to X-ray radiation and detects the X-ray radiation transmitted through the subject to obtain projection data (or raw data). There are various types of photographing means, including the rotate/rotate type in which an X-ray tube and a two-dimensional detector system are integrally rotated around the subject, the stationary/rotate type in which numerous detection elements are juxtaposed in a ring shape and only the X-ray tube is rotated around the subject, and the type in which the electron beam is deflected to electronically move the position of the X-ray source on the target. Any of such types is applicable to the radiation detector 1 according to this embodiment. For convenience of description, the X-ray CT apparatus of the rotate/rotate type is taken as an example in the following description.

Figure 13:
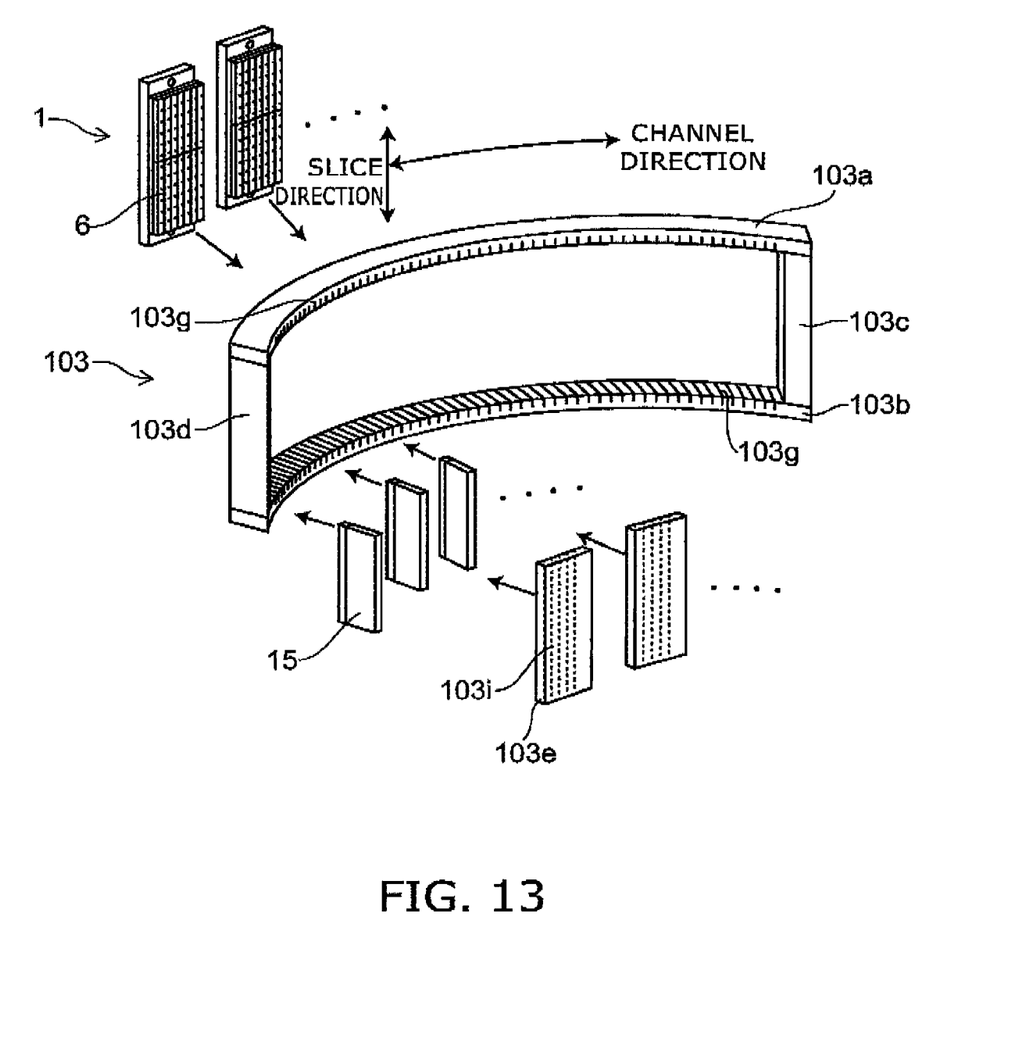
FIG. 13 is a schematic view for illustrating a two-dimensional detector system provided with the radiation detector according to this embodiment.

As shown in FIG. 12, the photographing means 100a includes an X-ray tube 101, a rotation ring 102, a two-dimensional detector system 103, a data acquisition circuit (data acquisition system, DAS) 104, a non-contact data transmission device 105, a frame driving unit 107, a slip ring 108, and the radiation detector 1 according to this embodiment (which is not shown in FIG. 12, but shown in FIG. 13).

The X-ray tube 101 serving as an X-ray source is a vacuum tube for generating X-ray radiation and provided on the rotation ring 102. Electric power (tube current, tube voltage) needed for X-ray exposure is supplied to the X-ray tube 101 from a high-voltage generating device 109 through the slip ring 108. It is noted that the high-voltage generating device 109 may be incorporated in the rotation ring 102. The X-ray tube 101 allows electrons accelerated by the supplied high-voltage electric power to impinge on the target, thereby emitting X-ray radiation toward the subject located in the effective field of view (FOV).

It is noted that between the X-ray tube 101 and the subject is provided an X-ray tube side collimator, not shown, for shaping the X-ray beam emitted from the X-ray tube 101 into a cone (quadrangular pyramid) or fan-beam configuration.

The two-dimensional detector system 103 is a detector system for detecting the X-ray radiation transmitted through the subject, and is provided on the rotation ring 102 so as to face the X-ray tube 101. A plurality of the radiation detectors 1, not shown, according to this embodiment are attached to the two-dimensional detector system 103. Attachment of the radiation detector 1 according to this embodiment is described later (see FIG. 13).

The X-ray tube 101 and the two-dimensional detector system 103 are provided on the rotation ring 102. The rotation ring 102 is driven by the frame driving unit 107 and rotated around the subject.

The data acquisition circuit (DAS) 104 includes an array of a plurality of data acquisition elements in which DAS chips are arrayed, and receives as input the data detected by the two-dimensional detector system 103 (hereinafter referred to as raw data). The inputted raw data is subjected to such processing as amplification and A/D conversion, and then transmitted to the preprocessing device 106 provided in the processing/displaying means 100b through the data transmission device 105.

The frame driving unit 107 drives, such as integrally rotates, the X-ray tube 101 and the two-dimensional detector system 103 about the central axis, which is parallel to the body axis of the subject inserted in the diagnostic opening, and controls the driving.

Next, the processing/displaying means 100b is illustrated. The processing/displaying means 100b includes a preprocessing device 106, a high-voltage generating device 109, a host controller 110, a storage device 111, a reconstructing device 114, an input device 115, a display device 116, an image processing device 118, a network communication device 119, and a data/control bus 300.

The preprocessing device 106 receives raw data from the data acquisition circuit (DAS) 104 through the data transmission device 105 and performs sensitivity correction and X-ray intensity correction. The raw data preprocessed by the preprocessing device 106 is referred to as "projection data".

The high-voltage generating device 109 supplies electric power needed for X-ray exposure to the X-ray tube 101 through the slip ring 108. The high-voltage generating device 109 illustratively includes a high-voltage transformer, a filament heating converter, a rectifier, and a high-voltage switch.

The host controller 110 generally controls various processes such as photographing, data processing, and image processing.

The storage device 111 stores image data, such as acquired raw data, projection data, and CT image data.

The reconstructing device 114 performs reconstruction processing on the projection data on the basis of prescribed reconstruction parameters (such as a reconstruction region size, a reconstruction matrix size, and a threshold for extracting a site of interest) to create reconstructed image data corresponding to a particular slice. In general, the reconstruction process is based on the cone-beam reconstruction (such as the Feldkamp method and the ASSR method) or the fan-beam reconstruction, either of which can be used.

The input device 115 illustratively includes a keyboard, various switches, and a mouse, allowing an operator to input various scan conditions, such as the slice thickness and the number of slices.

The image processor 118 performs image processing for display, such as window conversion and RGB processing, on the reconstructed image data created by the reconstructing device 114, and outputs the result to the display device 116. Furthermore, under instructions from the operator, the image processor 118 creates a so-called pseudo three-dimensional image, such as a tomographic image of an arbitrary cross section, a projection image from an arbitrary direction, and a three-dimensional surface image, and outputs it to the display device 116. The outputted image data is displayed as an X-ray CT image on the display device 116.

The network communication device 119 exchanges various data with other devices and network systems such as RIS (radiology information system) through the network.

The data/control bus 300 is a signal line for connecting between various devices and transmitting/receiving various data, control signals, address information and the like.

Next, the two-dimensional detector system 103 is further illustrated.

FIG. 13 is a schematic view for illustrating a two-dimensional detector system provided with the radiation detector 1 according to this embodiment.

As shown in FIG. 13, the two-dimensional detector system 103 includes a first support member 103a and a second support member 103b shaped like an arc, a third support member 103c and a fourth support member 103d provided between the first support member 103a and the second support member 103b, a cover 103e provided on the inner peripheral side of the first support member 103a and the second support member 103b, and the radiation detector 1 according to this embodiment provided on the outer peripheral side of the first support member 103a and the second support member 103b.

The first support member 103a and the second support member 103b are each shaped like an arc and provided with grooves 103g for inserting collimator plates 15. These grooves 103g are formed at an equal pitch along the X-ray incidence direction so that the X-ray focus is located in the plane containing the inserted collimator plates 15. The first support member 103a and the second support member 103b are positioned and fixed by the third support member 103c and the fourth support member 103d so that the corresponding grooves 103g are opposed to each other.

A plurality of the covers 103e are provided along the channel direction so that they can be adapted to the inner peripheral shape of the two-dimensional detector system 103 (i.e., the inner peripheral shape of the first support member 103a and the second support member 103b). The cover 103e supports collimator plates 15 from the inner peripheral side of the first support member 103a and the second support member 103b. To this end, the cover 103e has grooves 103i for inserting one end of the collimator plates 15. The cover 103e can be made of a material which is superior in resistance to X-ray radiation, workability, X-ray transmittance, and mechanical structural strength, such as polyethylene terephthalate, epoxy resin, and carbon fiber resin.

A plurality of the radiation detectors 1 according to this embodiment are provided along the channel direction so that they can be adapted to the outer peripheral shape of the two-dimensional detector system 103 (i.e., the outer peripheral shape of the first support member 103a and the second support member 103b).

As shown in FIG. 13, the collimator plate 15 is inserted in the groove 103g, the groove 103i, and the groove 6 of the radiation detector 1, and bonded using an adhesive. Thus, the collimator plate 15 is fixed with its four sides being constrained.

Next, the function of the X-ray CT apparatus according to this embodiment is illustrated.

In photographing a subject inserted in the diagnostic opening to obtain a desired image, first, various scan conditions, such as the slice thickness and the number of slices, are inputted from the input device 115.

Upon the start of operation of the X-ray CT apparatus 100, the rotation ring 102 starts rotation, and simultaneously, X-ray radiation is emitted from the X-ray tube 101 toward the subject.

The X-ray radiation transmitted through the subject reaches the radiation detector 1 of the two-dimensional detector system 103 opposed to the X-ray tube 101 across the subject.

The radiation detector 1 is provided with a collimator plate 15, which eliminates scattered X-ray radiation incident from directions other than the focus direction of the X-ray tube 101. Hence, only the light produced by the X-ray radiation from the focus direction of the X-ray tube 101 is incident on the photoelectric conversion means 12 of the radiation detector 1.

The light received by the photoelectric conversion means 12 is converted to an electrical signal proportional to its intensity and outputted to the data acquisition circuit (DAS) 104. The electrical signal (raw data) inputted to the data acquisition circuit (DAS) 104 is subjected to such processing as amplification and A/D conversion, and then transmitted to the preprocessing device 106. The preprocessing device 106 performs sensitivity correction and X-ray intensity correction on the received raw data and creates projection data. The reconstructing device 114 creates reconstructed image data corresponding to a particular slice from the projection data on the basis of prescribed reconstruction parameters. The image processor 118 performs image processing for display, such as window conversion and RGB processing, on the reconstructed image data, and outputs the result to the display device 116. Thus, a tomographic image (slice image) of the subject is obtained. Furthermore, under instructions from the operator, the image processor 118 also creates a so-called pseudo three-dimensional image, such as a tomographic image of an arbitrary cross section, a projection image from an arbitrary direction, and a three-dimensional surface image. The raw data, the projection data, the image data and the like are stored in the storage device 111.

As illustrated above, in the X-ray CT apparatus 100 provided with the radiation detector 1, the amount of X-ray radiation for each compartment is converted to an electrical signal, which is used to calculate (reconstruct) a tomographic image. Thus, if the variation of the ambient temperature causes any positional displacement or gap between the radiation detection units 10a, 10b provided in the radiation detector 1, the continuity of data is disturbed, and artifacts and the like occur in the reconstructed CT image and degrade the image quality. Furthermore, as the number of radiation detection units disposed in the slice direction is increased for rapid and high-definition photographing in a wide area, the effect associated with temperature variation may increase.

In this embodiment, the buffer section 3a, 3b for absorbing the force generated by the difference in the amount of thermal expansion or shrinkage is provided at the junction between the radiation detection unit 10a, 10b and the base plate 2. Hence, the positional displacement and gap of the radiation detection units 10a, 10b can be avoided. Furthermore, the positional displacement in the channel direction can also be prevented.

Thus, a high-quality image free from artifacts and the like can be obtained. Furthermore, even if the number of radiation detection units disposed in the slice direction is increased for rapid and high-definition photographing in a wide area, the positional displacement and gap can be avoided, and hence a high-quality image free from artifacts and the like can be obtained.

The embodiments of the invention have been illustrated. However, the invention is not limited to the foregoing description.

The above embodiments can be suitably modified by those skilled in the art, and such modifications are also encompassed within the scope of the invention as long as they fall within the spirit of the invention.

For example, the shape, dimension, material, layout and the like of each component of the radiation detectors 1, 1a, 1b, 1c, 1d, and the X-ray CT apparatus 100 are not limited to those illustrated above, but can be suitably modified.

Furthermore, the conditions for manufacturing the radiation detector, the type of the adhesive, and the processing method are not limited to those illustrated above, but can be suitably modified.

The components of the above embodiments can be combined as long as feasible, and such combinations are also encompassed within the scope of the invention as long as they fall within the spirit of the invention.

The invention claimed is:

1. A radiation detector comprising:
   a base plate; and
   a plurality of radiation detection units provided on one major surface side of the base plate and configured to output an electrical signal proportional to intensity of radiation,
   the plurality of radiation detection units being provided in series with longitudinal end surfaces abutting each other,
   the base plate including a plurality of buffer sections at a plurality of junctions with the plurality of radiation detection units, the plurality of buffer sections being configured to absorb stress generated at the plurality of junctions due to temperature variation.

2. The radiation detector according to claim 1, wherein the plurality of the buffer sections are provided along longitudinal direction of the base plate.

3. The radiation detector according to claim 1, wherein the buffer section is provided at least near longitudinal ends of the base plate.

4. The radiation detector according to claim 1, wherein the base plate includes:
   a first one of the plurality of buffer sections provided near longitudinal ends of the base plate; and
   a second one of the plurality of buffer sections provided nearer to the longitudinal center of the base plate than the first buffer section,
   the first buffer section being more elastically deformable than the second buffer section.

5. The radiation detector according to claim 1, wherein the buffer section is provided at every junction between the base plate and the radiation detection unit.

6. The radiation detector according to claim 1, wherein the buffer section is not provided at least near one of the abutting portions.

7. The radiation detector according to claim 1, wherein the junction of the base plate with the radiation detection unit includes an attachment hole configured to join the base plate and the radiation detection unit.

8. The radiation detector according to claim 7, wherein the buffer section provided near longitudinal ends of the base plate includes the attachment hole singly.

9. The radiation detector according to claim 7, wherein a plurality of the buffer sections are provided in series with longitudinal end surfaces abutting each other, and the buffer section provided near the abutting portion includes a plurality of the attachment holes.

10. The radiation detector according to claim 1, wherein the buffer section includes a buffer region configured to absorb the stress by elastic deformation.

11. The radiation detector according to claim 10, wherein the buffer region includes:
   a first node having a large thickness as viewed parallel to the major surface of the base plate;
   a second node provided in a direction crossing the first node and having a large thickness as viewed parallel to the major surface of the base plate;
   a third node provided generally parallel to the first node and having a large thickness as viewed parallel to the major surface of the base plate;
   a fourth node provided generally parallel to the second node and having a large thickness as viewed parallel to the major surface of the base plate;
   a first deformation section provided between a first end of the first node and a first end of the second node, having a small thickness as viewed parallel to the major surface of the base plate, and being elastically deformable in bending direction;
   a second deformation section provided between a second end of the second node and a first end of the third node, having a small thickness as viewed parallel to the major surface of the base plate, and being elastically deformable in the bending direction;
   a third deformation section provided between a second end of the third node and a first end of the fourth node, having a small thickness as viewed parallel to the major surface of the base plate, and being elastically deformable in the bending direction; and
   a fourth deformation section provided between a second end of the first node and a second end of the fourth node, having a small thickness as viewed parallel to the major surface of the base plate, and being elastically deformable in the bending direction.

12. The radiation detector according to claim 11, wherein
   the third node has generally the same length dimension as the first node, and
   the fourth node has generally the same length dimension as the second node.

13. The radiation detector according to claim 10, wherein the buffer region includes:
   a first node having a large thickness as viewed parallel to the major surface of the base plate;
   a second node provided in a direction crossing the first node and having a large thickness as viewed parallel to the major surface of the base plate; and
   a deformation section provided between the first node and one end of the second node, having a small thickness as viewed parallel to the major surface of the base plate, and being elastically deformable in bending direction.

14. The radiation detector according to claim 1, wherein
   the buffer section includes a first buffer region and a second buffer region, and
   the first buffer region and the second buffer region are provided at positions generally symmetric with respect to a line segment connecting between the centers of a plurality of attachment holes configured to join the base plate and the radiation detection unit.

15. The radiation detector according to claim 14, wherein the first buffer region and the second buffer region are formed as a combination of a plurality of holes penetrating through the base plate.

16. The radiation detector according to claim 1, wherein the buffer section includes a sliding section configured to absorb the stress by sliding movement.

17. The radiation detector according to claim 16, wherein a plurality of the sliding sections are provided along longitudinal direction of the base plate.

18. The radiation detector according to claim 16, wherein the sliding section is provided at least near longitudinal ends of the base plate.

19. The radiation detector according to claim 1, wherein the buffer section is elastically deformable.

20. An X-ray CT apparatus comprising:
   an X-ray source;
   a radiation detector configured to output an electrical signal corresponding to intensity of X-ray radiation which is applied from the X-ray source and transmitted through a subject;
   a rotation ring configured to allow the X-ray source and the radiation detector to rotate around the subject; and a reconstructing device configured to reconstruct a tomographic image of the subject on basis of the electrical signal outputted from the radiation detector, the radiation detector including:
- a base plate; and
- a radiation detection unit provided on one major surface side of the base plate and configured to output an electrical signal proportional to intensity of radiation,
- the base plate including a buffer section at a junction with the radiation detection unit, the buffer section being configured to absorb stress generated at the junction due to temperature variation.

21. The X-ray CT apparatus according to claim 20, wherein a plurality of radiation detection units are provided on one major surface side of the base plate, the plurality of radiation detection units are configured to output an electrical signal proportional to intensity of radiation, and the plurality of radiation detection units are provided in series with longitudinal end surfaces abutting each other.

22. A method for manufacturing a radiation detector, comprising:
- forming a plurality of radiation detection units by fixing a photoelectric conversion device on a surface of a scintillator opposite to a surface thereof on which radiation is incident;
- processing a base plate to form a plurality of junctions with the plurality of radiation detection units and a plurality of buffer sections configured to absorb stress generated at the plurality of junctions due to temperature variation; and
- attaching the plurality of radiation detection units to the base plate,
- at least one or more of the plurality of junctions being formed in the plurality of buffer sections, the plurality of radiation detection units being provided in series with longitudinal end surfaces abutting each other.

* * * * *